United States Patent
Aretz

[11] Patent Number: 6,096,256
[45] Date of Patent: Aug. 1, 2000

[54] METHOD OF MAKING INSERTS FOR MOLDED PLASTIC PARTS

[75] Inventor: Peter J. Aretz, Edinboro, Pa.

[73] Assignee: Buffalo Molded Plastics, Inc., Troy, Mich.

[21] Appl. No.: 09/072,533

[22] Filed: May 4, 1998

[51] Int. Cl.[7] .............................. B29C 45/14; B29C 70/70
[52] U.S. Cl. ........................... 264/263; 264/266; 264/274
[58] Field of Search ..................................... 264/261, 263, 264/274, 275, 249, 265, 271.1, 266

[56] References Cited

U.S. PATENT DOCUMENTS

| | | |
|---|---|---|
| 3,502,541 | 3/1970 | Hermitte et al. . |
| 3,773,875 | 11/1973 | Lammers . |
| 3,808,689 | 5/1974 | Spinella . |
| 4,285,902 | 8/1981 | Braverman ............................ 264/274 |
| 4,286,001 | 8/1981 | Frau . |
| 4,400,336 | 8/1983 | Thomas . |
| 4,420,447 | 12/1983 | Nakashima . |
| 4,501,541 | 2/1985 | Bethell et al. . |
| 4,661,391 | 4/1987 | Schroder et al. . |
| 4,734,230 | 3/1988 | Rhodes, Jr. et al. . |
| 4,753,586 | 6/1988 | Curtis . |
| 4,766,025 | 8/1988 | Kanok et al. . |
| 4,793,784 | 12/1988 | Belleville et al. . |
| 4,824,069 | 4/1989 | Shoji et al. . |
| 4,840,761 | 6/1989 | Zenhausern et al. .................... 264/274 |
| 4,842,785 | 6/1989 | Daigle et al. ........................... 264/274 |
| 5,069,838 | 12/1991 | Mori et al. . |
| 5,200,252 | 4/1993 | Kelman ................................. 264/271.1 |
| 5,368,797 | 11/1994 | Quentin et al. ......................... 264/274 |
| 5,393,479 | 2/1995 | Nadeau .................................... 264/219 |
| 5,429,742 | 7/1995 | Gutman et al. . |
| 5,474,841 | 12/1995 | Matsuki et al. . |
| 5,478,627 | 12/1995 | Hara et al. . |
| 5,608,957 | 3/1997 | Hanagan . |
| 5,688,460 | 11/1997 | Ruschke ................................... 264/266 |
| 5,705,113 | 1/1998 | Kane et al. ............................. 264/271.1 |
| 5,707,473 | 1/1998 | Agrawal et al. ....................... 264/271.1 |
| 5,783,133 | 7/1998 | Hara et al. .............................. 264/266 |
| 5,911,936 | 6/1999 | Hanazaki et al. ....................... 264/266 |

FOREIGN PATENT DOCUMENTS

| | | |
|---|---|---|
| 0 583 542 A1 | 2/1994 | European Pat. Off. . |
| 0 586 908 A1 | 3/1994 | European Pat. Off. . |
| 3604175 A1 | 8/1986 | Germany . |
| DE 196 19 892 A1 | 6/1997 | Germany . |
| 197 54 180 A 1 | 6/1998 | Germany . |
| WO 97 21766 | 6/1997 | WIPO . |

Primary Examiner—Angela Ortiz
Attorney, Agent, or Firm—Piper Marbury Rudnick & Wolfe

[57] ABSTRACT

Molded plastic parts having inserts associated therewith and a method for their production. The method of the invention consists in providing a mold and positioning an insert in the mold cavity. The insert may comprise part of a latch or nut structure which will ultimately be used for attaching the part to be molded to another part. A pre-molded plastic part is associated with the insert when the latter is placed in the mold. This pre-molded plastic part will be in the form of a cap or other shape which is adapted to at least partially envelope the insert. The plastic to be molded is then introduced to the mold cavity and brought into contact with the pre-molded plastic part. Heat applied to the plastic to be molded, and/or pressure as normally applied during molding, will cause the pre-molded plastic part to deform and take a shape conforming at least in part to the exterior shape of the insert. This will serve to secure the insert in place since, at the same time, the plastic to be molded adheres securely to and bonds with the pre-molded plastic part.

7 Claims, 2 Drawing Sheets

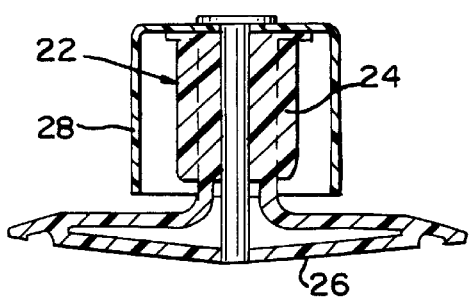
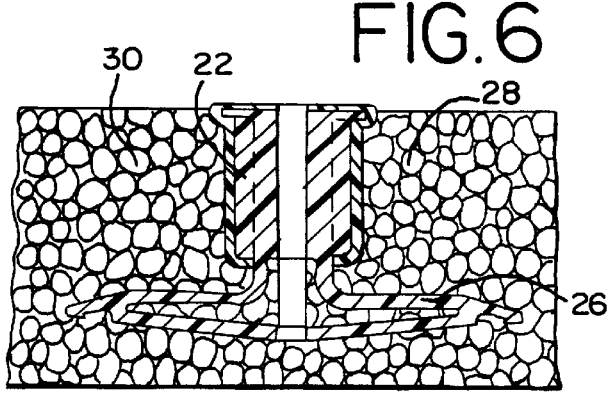
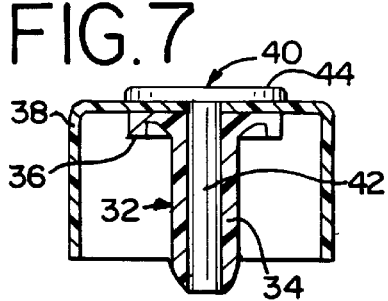
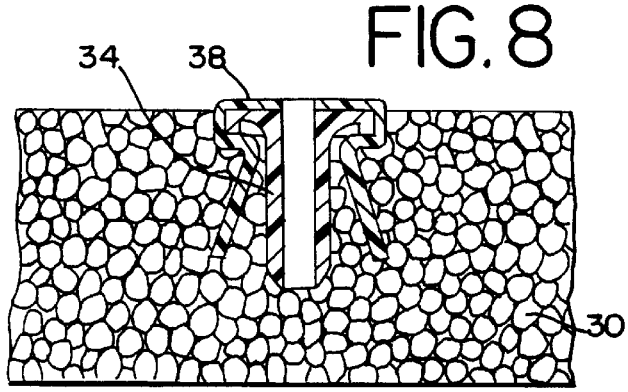
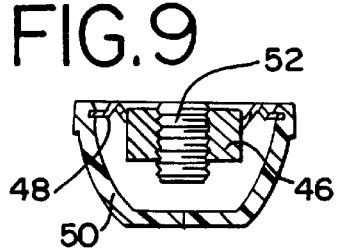
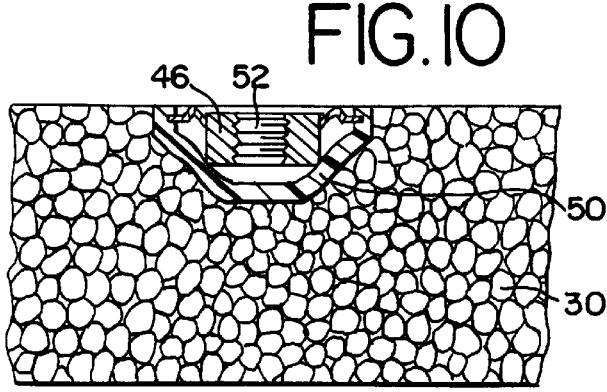
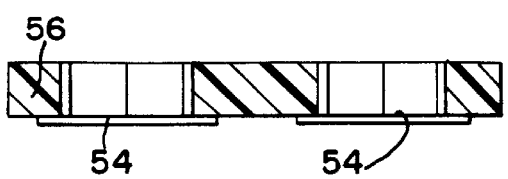
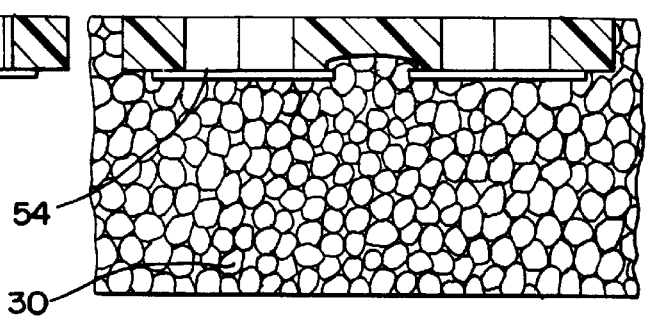

METHOD OF MAKING INSERTS FOR MOLDED PLASTIC PARTS

BACKGROUND OF THE INVENTION

This invention relates to molded plastic parts and to methods for their production. In particular, the invention is concerned with plastic parts that have one or more inserts embodied in the part.

Parts of the type described may, for example, comprise panels of the type to be attached on the inside of automobile doors in the process of manufacturing an automobile. The doors typically are made of sheet metal and plastic panels are attached to the sheet metal to achieve a pleasing interior appearance for the automobile.

U.S. patent application Ser. No. 08/963,955 filed on behalf of the assignee of this application, describes a method and products utilizing polyolefin and polyphenyloxide in the formation of plastic parts such as automobile door panels. In this application, reference is made to the fact that a frame may be molded together with or attached to a molded part. The frame would then provide a means to facilitate attachment of the part to a sheet metal door or the like.

SUMMARY OF THE INVENTION

This invention is concerned with molded plastic parts having inserts associated therewith. In the preferred form of the invention, the inserts comprise means for assisting in the attachment of the molded plastic part to another part such as an automobile door. Such inserts may comprise attachment means which consist of or are designed to hold fasteners. For example, a latch mechanism could be molded into the plastic part or a threaded nut molded into the part. A complementary latch part or a bolt would then be associated with the door or the like to secure the molded plastic panel or other part in place.

The method of the invention, in particular, consists in providing a mold and positioning a desired insert in the mold cavity. As indicated, the insert may comprise part of a latch or nut structure which will ultimately be used for attaching the part to be molded to another part. This latch or nut structure would typically be a metal part or a high melting point plastic that does not bond readily to the plastic being used for molding.

The invention calls for the use of a pre-molded plastic part to be associated with the insert when the latter is placed in the mold. This pre-molded plastic part will be in the form of a cap or other shape which is adapted to at least partially envelope the insert. The plastic to be molded is then introduced to the mold cavity and brought into contact with the pre-molded plastic part.

Heat applied to the plastic to be molded, and/or pressure as normally applied during molding, will cause the pre-molded plastic part to deform and take a shape conforming at least in part to the exterior shape of the insert. This will serve to secure the insert in place since, at the same time, the plastic to be molded adheres securely to and bonds with the pre-molded plastic part.

In the preferred form of the invention, the moldable plastic introduced to the mold will comprise plastic beads selected from the group consisting of polyolefin, polystyrene and polyphenyloxide beads. Such plastic will not normally adhere well to a metal or plastic insert used for fastening purposes. With the concept of the invention wherein the intermediate pre-molded plastic part is caused to conform around the insert, and wherein the be ads will bond securely to the pre-molded part, a most satisfactory plastic product with built-in attachment means will result.

DESCRIPTION OF THE DRAWINGS

FIG. 5 is a fragmentary cross-sectional view illustrating an assembly of a pre-molded plastic part and attachment means employed in accordance with one embodiment of the invention;

FIG. 6 is a fragmentary cross-sectional view illustrating the assembly of FIG. 5 after molding;

FIG. 7 is a fragmentary cross-sectional view illustrating an alternative assembly;

FIG. 8 is a fragmentary cross-sectional view of the assembly of FIG. 7 after molding;

FIG. 9 is a fragmentary cross-sectional view illustrating a further alternative assembly;

FIG. 10 is a fragmentary cross-sectional view of the assembly of FIG. 9 after molding;

FIG. 11 is fragmentary cross-sectional view of a still further alternative assembly; and, FIG. 12 is a fragmentary cross-sectional view of the assembly of FIG. 11 after molding.

DESCRIPTION OF THE PREFERRED EMBODIMENTS

As described in the aforementioned co-pending application, an example of the application of the invention can be found in the molding of the plastic product 8 utilizing a cavity mold part 10 and male core part 12. The core part defines a surface shaped to conform to the inside surface of the plastic part and openings in either mold part may be used to introduce plastic beads or the like into the cavity defined between the parts. A steam chest or other source of heat is employed to preheat the plastic and/or to heat the plastic while confined in the mold cavity. Vacuum and/or positive pressure may be employed to ensure strict conformance of the plastic to the mold contours.

Figure 1:
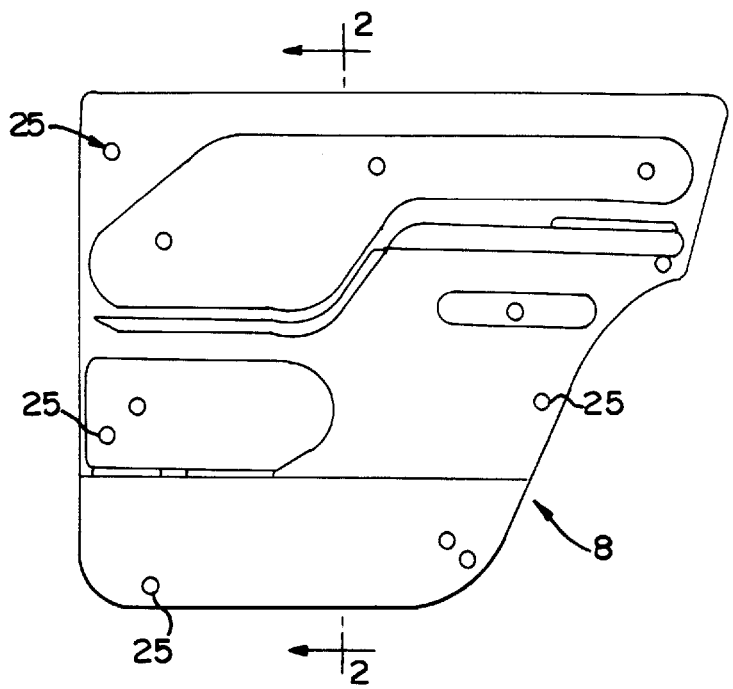
FIG. 1 is an elevational view of a molded door panel of the type contemplated by this invention.
Figure 2:
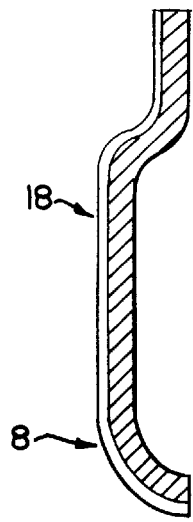
FIG. 2 is a cross-sectional view of the door panel taken about the line 2—2 of FIG. 1.
Figure 3:
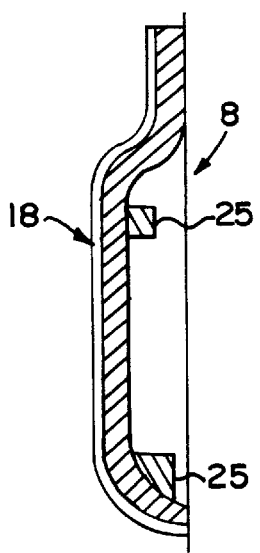
FIG. 3 is a cross-sectional view of the door panel illustrating the provision of in-molded panel attachment areas.
Figure 4:
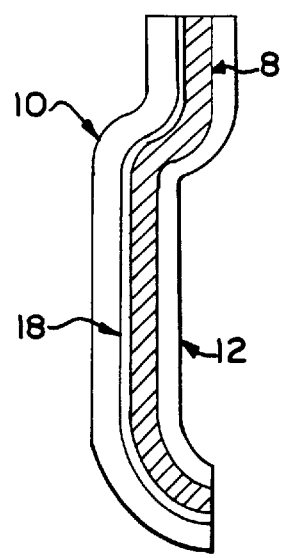
FIG. 4 is a cross-sectional view illustrating cavity and core parts in association with the molded part.

FIGS. 2 and 3 show a typical molded plastic product 8 adapted for locating attachment means or other inserts formed in accordance with the practice of the invention. In this instance the molded part is shown with a vinyl sheet or the like 18 bonded thereto but the use of such a sheet is not critical to the practice of this invention. It will also be understood that the inserts may be formed in the confines of the wall thickness of the product 10 or molded protrusions such as shown at 25 may be provided to enhance the wall thickness in the areas of the part where an attachment on other insert is to be included.

In FIGS. 5 and 6 insert 22 comprises a stem portion 24 and a wide base 26 serving as an anchoring means. The stem portion defines a bore which may be threaded so that a screw or nut may be inserted and securely held.

In the practice of the invention, a cylindrical cap 28 is located around stem portion 24. This cap is pre-molded of plastic such a polyethylene and is dimensioned for easy assembly. In this regard, the cap 28 and insert 22 may be temporarily attached at a desired location on a mold wall using an adhesive, a tape, magnets or any other means conventionally used for this purpose.

As shown in FIG. 6, when plastic 30 is introduced to the mold cavity and heat applied, the cap 28 is caused to collapse around the stem portion 24 and conform thereto. This serves to securely hold these parts in assembly, and this assembly is securely held in position relative to the plastic part being molded because the plastic introduced to the mold is compatible with and forms a bond with the plastic of the pre-molded cap. This compatibility and bonding capability is true to at least some degree with respect to plastics conventionally used for molding parts of this type and is especially true with respect to the use of polyolefin, polystyrene or polyphenyloxide beads in combination with a plastic cap of compatible chemistry. For example, a polystyrene cap could be used in conjunction with polystyrene or polyolefin beads, or a polyolefin cap with polyolefin beads, or a polyphenyloxide cap with polyphenyloxide beads.

FIGS. 7 and 8 illustrate a modified arrangement wherein a "snap-action" receiver 32 having a stem portion 34 and shoulder portion 36 is to be associated with a plastic part. In this instance, pre-molded plastic cap 38 is provided with an opening in its top wall adapted to be aligned with the bore of the receiver 32. A nylon plug 40 having stem 42 and head 44 is adapted to be temporarily attached to the receiver while holding the cap in place. This assembly is positioned on a mold surface and moldable plastic is introduced as shown in FIG. 8. The cap is caused to at least partially deform for securing the receiver and the moldable plastic bonds with the cap, all as described above.

The plug 40 is removed after molding leaving an opening for a rivet, pin, screw or the like for positioning within the bore of the receiver 32 when the molded part is to be associated with a sheet metal door or other part. It will be appreciated that the plug 40 will serve to prevent plastic from entering the receiver 32 during molding.

FIGS. 9 and 11 illustrate an attachment means comprising a nut 46 defining a retainer flange 48. Polyethylene cap 50 defines an open end dimensioned to resiliently receive the flange for holding these parts in an assembly which can then be positioned on a mold surface.

As shown in FIG. 10, when moldable plastic is introduced, the heat will cause the pre-molded cap to deform for secure engagement with the nut. A set screw 52 may be inserted to insure against entry of plastic into the bore of the nut during molding. This or a different type of screw may then be used to secure the molded part to another part.

FIGS. 11 and 12 show a still further insert design comprising flange nuts 54 which are loosely located in side-by-side bores defined by polyethylene plate 56. As the plate deforms in response to the heat of molding, it is caused to tightly confine the nuts to mechanically hold the nuts, and the bonding of moldable plastic to the pre-molded plate further encapsulates the nuts.

The system of the invention avoids the need for adhesives, staples, screws, clips, latches, buckles, heat bonds, spin welds, pinch bonds or other techniques for securing inserts to plastic parts. The invention is particularly useful in connection with polyolefin, polystyrene or polyphenyloxide parts where conventional techniques for securing inserts in place were simply unsuitable due to the light and porous nature of these moldable plastics. The system of this invention is also characterized by structural integrity and dimensional stability.

As noted, polyethylene is one material used for the caps or plates since this material is available with a softening temperature lower than or at least equal to the processing temperatures for the beads mentioned above (220 to 360 degrees F.). This allows the cap or plate to melt at least to the extent necessary for achieving the bonding and deformation described. Similar considerations are applied when using polyphenyloxide or polypropopylene.

As set forth, the inserts may be of metal but could also be of hard plastic of suitable strength to achieve an attaching function or other function called for. Where of plastic, some surface melting of the insert may occur to achieve even greater adherence of the insert with the cap or plate and with the moldable plastic while avoiding any damage to insert threads or other attachment features. The use of plugs as described will also be of benefit in this regard.

Particularly where the inserts are formed of a hard plastic, the cap or plate associated therewith may be molded integrally with the insert. Thus, the structure of FIG. 7 (absent the plug 40) or the structure of FIG. 11, for example, could be one integrally molded part to be located in a mold prior to injection of beads. This arrangement is particularly desirable when recycling since no incompatible material would be employed.

It will be understood that various changes and additions may be made to the invention described without departing from the spirit of the invention particularly as described in the following claims.

I claim:

1. A method for producing a molded plastic part having at least one insert embedded therein, the steps comprising;

a) providing a mold defining a mold cavity;

b) providing an insert including a fastening means with a bore therein;

c) providing a pre-molded plastic cap with an opening, said premolded plastic cap dimensioned to fit around said insert;

d) providing a plug dimensioned to pass through the opening of the pre-molded plastic cap and engage the bore of the insert;

e) locating said insert within the pre-molded plastic cap so that the bore of the insert is aligned with the opening of the pre-molded plastic cap;

f) inserting said plug into the bore of said insert;

g) positioning said insert, said pre-molded plastic cap and said plug within said mold cavity;

h) delivering moldable plastic that is compatible and forms a bond with the plastic of the pre-molded plastic cap to-said mold cavity to substantially fill the mold cavity; and i) applying heat to cause the pre-molded plastic cap to collapse around the insert and conform thereto, the heat also causing the moldable plastic to form a bond with the pre-molded plastic cap so that the insert and the pre-molded plastic cap are held in assembly and securely in position relative to the plastic pant being molded.

2. The method according to claim 1 further comprising the steps of removing the molded plastic part from the mold and removing the plug from the bore of the insert.

3. The method according to claim 1 wherein tee insert is a nut and the plug is a set screw.

4. The method according to claim 3 wherein the nut includes a retainer flange and said retainer flange engages the pre-molded plastic cap during step e).

5. A method according to claim 1 wherein said moldable plastic comprises plastic beads selected from the group consisting of polyolefin, polystryrene and polyphenloxide beads, and wherein heat is applied after delivering said beads to said mold cavity.

6. A method according to claim 5 wherein said pre-molded plastic part is formed of a plastic selected from the group consisting of polythethylene, polyphenloxide and polystyrene, said pre-molded part having a softening temperature equal to or less than the processing temperature for said beads.

7. A method according to claim 1 wherein said molded plastic part comprises an automobile door panel.

* * * * *